United States Patent [19]
Vilella Jirau

[11] Patent Number: 6,030,596
[45] Date of Patent: Feb. 29, 2000

[54] SYNTHESIS OF DIAMONDS

[76] Inventor: Mario Q. Vilella Jirau, HC-44 Box 13062, Cayey, Puerto Rico 00736

[21] Appl. No.: 08/797,668

[22] Filed: Jan. 31, 1997

[51] Int. Cl.⁷ .................................................. B01J 3/06
[52] U.S. Cl. ............................................................ 423/446
[58] Field of Search .............................................. 423/446

[56] References Cited

U.S. PATENT DOCUMENTS 3,702,573  11/1972  Nemeth ........................................ 29/95

*Primary Examiner*—Steven P. Griffin
*Assistant Examiner*—Stuart L. Hendrickson
*Attorney, Agent, or Firm*—Bowen, Lhota & Firtell, P.A.; David P. Lhota, Esq.

[57] ABSTRACT

A method for making diamonds by heating a heterogeneous dispersion of carbon made by the pyrolisis of an organic material and copper metal in a convenient pressure vessel while maintained at a pressure of 100,000 psi. The copper content of the reacting mass should be maintained within 15% of the total for best results.

13 Claims, No Drawings

SYNTHESIS OF DIAMONDS

CROSS REFERENCE TO RELATED APPLICATIONS

STATEMENT REGARDING FEDERALLY SPONSORED RESEARCH OR DEVELOPMENT

Not applicable.

BACKGROUND OF THE INVENTION

1. Field of Invention

This invention relates to a method for synthesizing diamonds, from non-diamond carbon by utilizing copper as the solvent and carbon produced by the pyrolisis of an organic compound, such as a carbohydrate like household sugar as the solute. Under laboratory conditions, in an assemblage where one of the parameters is an applied pressure of 100,000 pounds per square inch, copper behaves like a solvent which favors the crystallization of carbon into the cubic system well under the parameters of heat, pressure and time established by other patented processes or thermodynamic considerations.

2. Description of the Background Art

Most synthetic diamonds are created, in industry, using very high pressures, in the order of a million pounds per square inch or more by heating a mixture of carbon or a carbon bearing substance with a carbide forming metal. Copper forms an unstable carbide at ordinary conditions of heat and pressure which explodes when disturbed by heat or handling. Copper is used in some formulations with other metals to increase the heat conductivity of the resulting mass specially when used for cutting tools. No mention is made, in the patent literature, of the use of copper metal as a solvent, when confined with carbon under conditions of high heat and pressure.

The synthesis of diamonds, in nature, has always been considered an enigma by most scientists. Current thermodynamic considerations on the stability of the diamond postulate the theory that they were created, in nature, at a depth of about 100 miles under the surface of the earth. It is problematic to envisage the mechanics of the transportation of diamonds to the surface, by means of a magmatic flow, without suffering etching, resorption or transformation into graphite while travelling through a diamond unstable region.

BRIEF SUMMARY OF THE INVENTION

This invention relates to a method for synthesizing diamonds, from non-diamond carbon by utilizing copper as the solvent and carbon produced by the pyrolisis of an organic compound, such as a carbohydrate like household sugar as the solute. Under laboratory conditions, in an assemblage where one of the parameters is an applied pressure of 100,000 pounds per square inch, copper behaves like a solvent which favors the crystallization of carbon into the cubic system well under the parameters of heat, pressure and time established by other patented processes or thermodynamic considerations.

In practice, the percent of copper dispersed in the carbon matrix should run between two to fifteen per cent by weight to give optimum results while the time exposure should be measured in seconds. Hence the electric current flow must be equivalent to thousand of amperes per square inch of charge cross-section. Estimates of the temperature reached may be way over the 3,000° Centigrade.

An object of this invention is to convert non-diamond carbon into diamond without the use of sophisticated extremes of pressure systems and expensive tool and die materials.

Another object of this invention is to reduce the conversion time from hours and minutes to seconds.

Another object of this invention is to lower the parameters established by conventional processes of heat, pressure, time and production costs to render diamonds more accesible to industrial businesses.

DETAILED DESCRIPTION OF THE INVENTION

These and other objects of this invention are accomplished by reacting a heterogeneous mixture of non-diamond carbon and copper at a pressure not higher than 100,000 per square inch while applying to the mixture ample thermal energy to raise the temperature of the reacting mass to the conversion temperature. It should be pointed out that a high volume hydraulic system be used to offset any sudden drop in volume or pressure loss.

The process of the present invention may be carried out in any type of pressure assemblage capable of satisfying the conditions of the synthesis. The apparatus I use was patented by the applicant and bears U.S. Pat. No. 2,694,922, although any other system, designed to withstand the pressure, may be optional.

While not bound by theoretical considerations, all indications are that, copper carbide, an unstable and explosive compound under normal conditions of heat and pressure, does form a stable copper-carbon system, under constraining forces, favoring the crystallization of carbon into the cubic system at a faster rate and lower pressures than those proposed by theoretical considerations on the stability of the diamond on the diamond-graphite phase diagrams.

In practice I prefer to use the method of thermally breaking down ordinary household sugar (sucrose) inside a close vented container. After all the smoke and fumes have subsided, the carbonaceous char is blended with a copper bearing substance, to achieve, in the final analysis, an optimum copper content, usually between 2 an 15 percent, designed to match the pressure, heat and time exposures.

A suitable solution of a copper compound such as the nitrate, sulfate, chloride or compound of copper that breaks down upon heating may be added in a proportion calculated to control the percent of copper in the final analysis to match the other parameters of pressure, heat and time. For best results I have used a solution of ammoniacal copper chloride.

The copper carbon blend is then heated inside a closed vented vessel to incipient red heat (700 –720° C) to remove the last remaining volatile impurities. Upon cooling, the carbonaceous mass is ground to a convenient particle size for ease of dispensing, such as the #50 Tyler Mesh Sieve size.

Once the desired pressure is reached, the heat energy may be applied by means of an electric current. Voltage, amperage and time are to be adjusted to raise the temperature of the mass to the reaction time in seconds. The current rise is exponential and a function of the other parameters such as the copper content of the charge, the negative resistivity of the carbon, the area of the cross section and the length of the reaction column. The carbon copper blend is very corrosive and will dissolve the containing walls of the refractory to form complex crystals of the silicate chemistry, hence a minimum of reaction time should be observed. Upon cooling, after firing, the residual carbonaceous mass may be destroyed with a hot mixture of Sulfuric, Perchloric and Chromic acids. Most of the crystals formed are of the octahedral habit and do show the characteristic presence of inverted trigons and rounded surfaces.

I claim:

1. A method for synthesizing diamonds, comprising the steps of:
   (a) providing a copper solvent;
   (b) obtaining carbon from the pyrolysis of an organic compound;
   (c) creating a blended fluid from said copper solvent and said carbon, wherein said copper solvent comprises 1.0%–15% of said fluid;
   (d) heating said fluid in a vented vessel to remove impurities and form a carbonaceous-copper mass; and
   (e) pressurizing said carbonaceous-copper mass.

2. A method as recited in claim 1, wherein said step of obtaining carbon comprises the steps of:
   thermally breaking down sucrose inside a vented vessel to form a carbonaceous char, said carbonaceous char comprising said carbon.

3. A method as recited in claim 1, wherein said heating step further comprises:
   placing said blended fluid in a reaction chamber;
   heating said blended fluid at approximately 700–720 degrees centigrade; and
   pressurizing said chamber to a pressure of approximately 100,000 p.s.i.

4. A method as recited in claim 2, further comprising the step of:
   grinding said carbonaceous char into particles.

5. A method as recited in claim 2, wherein said step of creating a blended fluid comprises the steps of:
   blending said carbonaceous char with said copper solvent to create said blended fluid.

6. A method as recited in claim 2, wherein said step of obtaining carbon further comprises the step of:
   waiting for at least a portion of the smoke and fumes, generated when thermally breaking down the sucrose, to dissipate before the step of creating a blended fluid.

7. A method as recited in claim 3, wherein said heating step further comprises:
   applying heat by way of an electrical current after obtaining the desired pressure.

8. A method for synthesizing diamonds from a non-diamond carbon, comprising the steps of:
   (a) producing a copper solvent;
   (b) obtaining a carbonaceous char from the pyrolysis of sucrose;
   (c) grinding said carbonaceous char;
   (d) creating a heterogeneous fluid from said copper solvent and said carbonaceous char, wherein said copper solvent comprises 1.0%–15% of said fluid;
   (e) heating said fluid to approximately 700 degrees centigrade in a vented vessel to remove impurities and form a carbonaceous-copper mass;
   (f) pressurizing said carbonaceous-copper mass; and
   (g) heating said carbonaceous-copper mass.

9. A method as recited in claim 8, wherein said pressurizing step comprises:
   pressurizing said carbonaceous-copper mass at approximately 100,000 p.s.i.

10. A method as recited in claim 8, wherein said heating step further comprises:
    pressurizing said carbonaceous-copper mass at approximately 6,000 to 7,000 atmospheres.

11. A method as recited in claim 8, wherein said step of obtaining carbon further comprises:
    thermally breaking down said sucrose inside a vented chamber forming said carbonaceous char and creating smoke and fumes.

12. A method as recited in claim 11, wherein said step of obtaining carbonaceous char further comprises the step of:
    waiting for at least a portion of the smoke and fumes, generated when thermally breaking down the sucrose, to dissipate before the step of creating a blended fluid.

13. A method as recited in claim 8, wherein said heating carbonaceous-copper mass step further comprises:
    applying heat by way of an electrical current.

* * * * *